United States Patent
Sambhy et al.

(10) Patent No.: US 12,503,615 B2
(45) Date of Patent: Dec. 23, 2025

(54) WHITE AQUEOUS INKJET INK

(71) Applicant: Xerox Corporation, Norwalk, CT (US)

(72) Inventors: Varun Sambhy, Pittsford, NY (US); Santokh S. Badesha, Pittsford, NY (US); Mihaela Maria Birau, Hamilton (CA); Sepehr M. Tehrani, Toronto (CA); Syed Mohsin Ali, Milton (CA)

(73) Assignee: Xerox Corporation, Norwalk, CT (US)

( * ) Notice: Subject to any disclaimer, the term of this patent is extended or adjusted under 35 U.S.C. 154(b) by 792 days.

(21) Appl. No.: 17/722,550

(22) Filed: Apr. 18, 2022

(65) Prior Publication Data
US 2023/0332002 A1 Oct. 19, 2023

(51) Int. Cl.
*C09D 11/037* (2014.01)
*C08K 3/30* (2006.01)
*C09D 11/322* (2014.01)

(52) U.S. Cl.
CPC .......... *C09D 11/037* (2013.01); *C08K 3/30* (2013.01); *C08K 2003/3018* (2013.01); *C08K 2201/005* (2013.01); *C08K 2201/019* (2013.01)

(58) Field of Classification Search
None
See application file for complete search history.

(56) References Cited

U.S. PATENT DOCUMENTS

| | | | |
|---|---|---|---|
| 5,389,958 A | 2/1995 | Bui et al. | |
| 2005/0004291 A1 | 1/2005 | Grimm et al. | |
| 2012/0195065 A1 | 8/2012 | Hyakuta et al. | |
| 2016/0369117 A1* | 12/2016 | Nishimura | C09D 17/003 |
| 2017/0267948 A1* | 9/2017 | Kniesel | C08K 3/22 |
| 2017/0267949 A1* | 9/2017 | Bird | C11D 17/04 |
| 2019/0249017 A1* | 8/2019 | Fujimura | C09C 1/3054 |
| 2019/0284414 A1 | 9/2019 | Bruinsma | |
| 2019/0375880 A1* | 12/2019 | Nakao | C08G 18/283 |
| 2021/0046698 A1 | 2/2021 | Fleischmann et al. | |
| 2021/0246323 A1* | 8/2021 | Hongo | C09D 11/322 |
| 2022/0356360 A1* | 11/2022 | Tehrani | C09D 11/033 |

FOREIGN PATENT DOCUMENTS

| | | | | |
|---|---|---|---|---|
| EP | 1859933 | | 11/2007 | |
| EP | 2535380 A1 * | 12/2012 | | C09D 11/322 |
| EP | 2097265 | | 2/2018 | |
| JP | 4091147 B2 * | 5/2008 | | |
| KR | 20220045007 | | 4/2022 | |
| WO | WO-2019182568 A1 * | 9/2019 | | B29C 64/165 |
| WO | WO-2021180553 A1 * | 9/2021 | | C08G 59/184 |

OTHER PUBLICATIONS

BYK Additives & Instruments, "Disperbyk-184" Data Sheet, Issue Nov. 2012. (Year: 2012).*
Machine English language translation of Inamura et al, JP4091147B2, Feb. 9, 1999. (Year: 2024).*
Extended European Search Report, Dated Sep. 13, 2023, Application No. 23165188.6-1102.
Varun Sambhy et al., U.S. Appl. No. 17/722,535, filed Apr. 18, 2022, entitled "Toner Composition," not yet published.
Sepehr M. Tehrani, U.S. Appl. No. 17/102,725, filed Nov. 24, 2020, entitled "High Viscosity Latexes," not yet published.
U.S. Appl. No. 17/313,097, filed May 6, 2021, entitled "Aqueous Inkjet Ink Compositions," not yet published.
U.S. Appl. No. 17/533,193, filed Nov. 23, 2021, entitled Polymeric Dispersant,) not yet published.
"CIELAB Color space," Wikipedia, at https://en.wikipedia.org/wiki/CIELAB_color_space, last edited Jun. 21, 2022.
Li, et al., "Ultrawhite BaSO4 Paints and Films For Remarkable Daytime Subambient Radiative Cooling," ACS Appl. Mater. Interfaces 2021, 13, 21733-21739, published Apr. 15, 2021.
Horiba, "A Guidebook To Particle Size Analysis," Horiba Scientific, Copyright 2019.
Joseph Peoples, et al., "A Strategy of Hierarchical Particle Sizes In Nanoparticle Composite For Enhancing Solar Reflection," International Journal Of Heat And Mass Transfer, 131 (2019) 487-494.
Mia Ellila, "The Use Of Barium Sulphate In Printing Inks As Filler Material," Bachelor of Engineering Thesis, Helsinki Metropolia University Of Applied Sciences, Dec. 9, 2011.

* cited by examiner

*Primary Examiner* — Coris Fung
*Assistant Examiner* — Caroline D. Liott
(74) *Attorney, Agent, or Firm* — Marylou J. Lavoie, Esq.

(57) ABSTRACT

An aqueous inkjet ink composition including water; an optional co-solvent; an optional dispersant; an optional resin; an optional wax; and a $BaSO_4$ pigment; wherein a particle size distribution is defined as Span=(Dn90−Dn10)/(Dn50); and wherein the $BaSO_4$ pigment has a wide particle size distribution wherein the Span is 0.75 or greater.

18 Claims, No Drawings

WHITE AQUEOUS INKJET INK

RELATED APPLICATIONS

Commonly assigned U.S. patent application Ser. No. 17/722,535, entitled "Toner Composition", filed concurrently herewith, which is hereby incorporated by reference herein in its entirety, describes A white toner having toner particles including: a resin; a $BaSO_4$ pigment; wherein a particle size is defined as Span=(Dn90−Dn10)/(Dn50); and wherein the $BaSO_4$ pigment has a wide particle size distribution wherein the Span is 0.75 or greater; and an optional wax.

BACKGROUND

Disclosed herein is an aqueous inkjet ink composition comprising: water; an optional co-solvent; an optional dispersant; an optional resin; an optional wax; and a $BaSO_4$ pigment; wherein a particle size distribution is defined as Span=(Dn90−Dn10)/(Dn50); and wherein the $BaSO_4$ pigment has a wide particle size distribution wherein the Span is 0.75 or greater.

Also disclosed is a process comprising: combining water; an optional co-solvent; an optional dispersant; an optional resin; an optional wax; and a $BaSO_4$ pigment; wherein a particle size distribution is defined as Span=(Dn90−Dn10)/(Dn50); and wherein the $BaSO_4$ pigment has a wide particle size distribution wherein the Span is greater than 0.75, to form an aqueous ink composition.

White inks have been added to standard CMYK color sets to improve image quality. White inks also help correct the perceived colors when printing on transparent or off-white substrates. Despite the benefits of including white inks in inkjet color sets, the complexities and challenges in formulating the inks has hindered them from reaching their full potential. One obstacle is early sedimentation of white pigment (generally titanium oxide nanoparticles) and lack of long-term colloidal stability. Titanium oxide nanoparticles (rutile, anatase, or both) have a very high density. In low viscosity mixtures, such as aqueous inkjet ink compositions (generally <10 cP), they sediment quickly. Once sedimentation occurs, gravity creates a compact, cemented residue at the bottom of the container which is generally not dispersible. Sedimentation plugs ink feed tubes, print heads, and nozzles. Sedimentation also leads to short shelf-life and short latency and decap time. Finally, sedimentation reduces the optical density of the printed ink and compromises print opacity.

White inks are desired for color gamut enhancement and for the ability to print on clear or cardboard substrates for packaging and label press application markets among others. It is believed that current commercial white aqueous inkjet inks use $TiO_2$ as a pigment.

U.S. patent application Ser. No. 17/313,097, filed May 6, 2021, entitled "Aqueous Inkjet Ink Compositions," hereby incorporated by reference herein in its entirety, describes an aqueous inkjet ink composition comprising a solvent system comprising water, a first organic solvent, and a second organic solvent, wherein the second organic solvent is an alkanediol having from 2 to 8 carbon atoms and the second organic solvent is present at an amount of from greater than 0 weight % to about 8 weight %; a white pigment; and resin particles, wherein, in embodiments, only $TiO_2$ is used as the white pigment. Methods of making and using the aqueous inkjet ink compositions are also provided.

There can be issues using $TiO_2$. $TiO_2$ has been deemed a category 2 suspected carcinogen and has come under regulatory scrutiny such as from the European Union. It is desirable to develop a replacement for $TiO_2$ such as for aqueous inkjet ink applications. It is particularly problematic that the loading of $TiO_2$ in white aqueous inkjet ink is so high in order to achieve the desired color characteristic. A safe and non-toxic white pigment is highly desirable for aqueous inkjet ink compositions.

The CIELAB color space (also known as CIE L*a*b* or sometimes abbreviated as simply "Lab" color space) is a color space defined by the International Commission on Illumination (CIE) in 1976. It expresses color as three values: L* for the lightness from black (0) to white (100), a* from green (−) to red (+), and b* from blue (−) to yellow (+).

Because three parameters are measured, the space itself is a three-dimensional real number space, which allows for infinitely many possible colors. In practice, the space is usually mapped onto a three-dimensional integer space for digital representation, and thus the L*, a*, and b* values are usually absolute, with a pre-defined range. The lightness value, L*, represents the darkest black at L*=0, and the brightest white at L*=100. The color channels, a* and b*, represent true neutral gray values at a*=0 and b*=0. The a* axis represents the green-red component, with green in the negative direction and red in the positive direction. The b* axis represents the blue-yellow component, with blue in the negative direction and yellow in the positive direction. The scaling and limits of the a* and b* axes will depend on the specific implementation, but they often run in the range of ±100 or −128 to +127 (signed 8-bit integer). For further information, see the article entitled "CIELAB color space" at the online encyclopedia, Wikipedia.

White aqueous inkjet ink compositions require a high loading of $TiO_2$, such as from about 15 to about 20 percent by weight, to achieve desired image quality including whiteness and opacity or hiding ability. A safe and non-toxic pigment that may enable meeting or exceeding L* aqueous ink print image performance is highly desirable.

Lack of colloidal stability may lead to early sedimentation of inks and may result in poor image quality such as reduced L* results and jetting failures. A safe and non-toxic pigment that can reduced the weight percent of pigment required to achieve desired L* targets and provide a more robust and reliable ink is highly desired.

Currently available inkjet ink compositions are suitable for their intended purposes. However a need remains for improved white inkjet ink compositions. Further, a need remains for a safe and non-toxic white pigment suitable for a white aqueous inkjet ink composition. Further, a need remains for an improved white aqueous inkjet ink composition that does not require use of $TiO_2$ to achieve desired white printed images such as white printed images having a desired L* image quality including whiteness, opacity, and hiding ability.

The appropriate components and process aspects of the each of the foregoing U. S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an aqueous inkjet ink composition comprising: water; an optional co-solvent; an optional dispersant; an optional resin; an optional wax; and a $BaSO_4$ pigment; wherein a particle size distribution is defined as Span=$(Dn90-Dn10)/(Dn50)$; and wherein the $BaSO_4$ pigment has a wide particle size distribution wherein the Span is 0.75 or greater.

Also described is a process comprising: combining water; an optional co-solvent; an optional dispersant; an optional resin; an optional wax; and a $BaSO_4$ pigment; wherein a particle size distribution is defined as Span=$(Dn90-Dn10)/(Dn50)$; and wherein the $BaSO_4$ pigment has a wide particle size distribution wherein the Span is greater than 0.75, to form an aqueous ink composition.

DETAILED DESCRIPTION

A composition and process is described for preparing white aqueous ink using $BaSO_4$ pigment. $BaSO_4$ is a safe and non-toxic white crystalline solid pigment. The $BaSO_4$ pigment enables a white aqueous inkjet ink that avoids use of $TiO_2$. The $BaSO_4$ pigment enables white aqueous inkjet inks to meet or significantly exceed the whiteness (L*) property of prior white inks such as those prepared by using $TiO_2$.

"Ultra-white" paints made using $BaSO_4$ have been shown to have the highest whiteness/reflectivity known to date. See Li, et al., "Ultrawhite $BaSO_4$ Paints and Films For Remarkable Daytime Subambient Radiative Cooling," ACS Appl. Mater. Interfaces 2021, 13, 21733-21739, which is hereby incorporated by reference herein in its entirety. The suitability of barium sulfate for aqueous inkjet ink applications has not been known.

In the present application, a hierarchical pigment particle size (broad pigment particle size distribution) is selected which enables maximum reflectivity (opacity) as more of the light wavelengths are reflected/scattered back. In embodiments, the present composition comprises $BaSO_4$ pigment having a broad particle size distribution which significantly enhances reflectance to provide a whiter, more opaque white ink. Maximizing light reflection/scattering maximizes opacity and enables a whiter, more opaque ink at lower loadings of pigment. In embodiments, the $BaSO_4$ pigment has a broad particle size distribution of about 400±130 nanometers which enables maximum reflection/scattering of incident visible light.

U.S. patent application Ser. No. 17/313,097, filed May 6, 2021, entitled "Aqueous Inkjet Ink Compositions," hereby incorporated by reference herein in its entirety, discloses a white ink wherein, in embodiments, only $TiO_2$ is used as the white pigment, and wherein, in embodiments, relatively small white pigment particles are used, having a $D_{50}$ particle size of less than 150 nm.

In the present embodiments, the $BaSO_4$ pigment particle size range is larger than the particle size of less than 150 nanometers used for white $TiO_2$ inks. The present aqueous inkjet ink composition employs $BaSO_4$ powder in place of $TiO_2$ pigment. In embodiments, the white aqueous inkjet composition herein is completely free of, that is, does not contain, $TiO_2$ pigment.

Further, the present aqueous ink jet ink composition employs a larger and wide size distribution for the $BaSO_4$ pigment which provides a maximized light reflectivity and thus opacity.

The present disclosure provides a stable, non-sedimenting aqueous inkjet ink composition including large size $BaSO_4$ particles.

In embodiments, an aqueous inkjet ink composition is provided comprising: water; an optional co-solvent; an optional dispersant; an optional resin; an optional wax; and a $BaSO_4$ pigment; wherein a particle size distribution is defined as Span=$(Dn90-Dn10)/(Dn50)$; and wherein the $BaSO_4$ pigment has a wide particle size distribution wherein the Span is 0.75 or greater.

The white aqueous inkjet ink composition includes a $BaSO_4$ pigment. Any suitable or desired $BaSO_4$ pigment may be selected.

As used herein, the term "median particle size" refers to a diameter where half of the population resides above this point, and half resides below this point (on a number distribution basis unless otherwise specified). Median particle size may also be referred to as the "Dn50."

Particle size can be measured by image analysis on micrographs taken using microscopy techniques such as SEM (scanning electron microscopy) or TEM (transmission electron microscopy). Microscopy and image analysis techniques report results as a number distribution of the particles. Particle size measurements can also be determined by dynamic light scattering or laser diffraction using a Nanotrac 252 instrument (from Microtrac, Inc.). Light scattering and laser diffraction techniques report results as a volume distribution of the particles. Particle size results from number distribution can be easily transformed to a volume distribution, and vice versa using methods known to those skilled in the art.

As disclosed herein, number distribution is measured with the diameter of the particle being measured along the longest axis. For example, number distribution is measured for an ellipse shape particle along the longest (or major) axis.

In embodiments, median values are defined as the value where half of the population resides above this point, and half resides below this point. For particle size distributions, the median is called the D50 (or x50 when following certain ISO guidelines). The D50 is the size that splits the distribution with half above and half below this diameter. The Dv50 (or Dv0.5) is the median for a volume distribution, Dn50 is used for number distributions, and Ds50 is used for surface distributions. Since the primary result from microscopy/image analysis is a number distribution, the D50 cited herein is the number median referred to as Dn50 herein. For further information, see "A Guidebook To Particle Size Analysis," Horiba Scientific, Copyright 2019, which is hereby incorporated by reference herein in its entirety.

In embodiments herein, Dn50 is defined as the particle size value at which 50% of the particle population resides below this value, wherein particle size is measured using microscopy/image analysis techniques and the particle size distribution is reported as a number distribution.

In embodiments herein, Dn10 is defined as the particle size value at which 10% of the particle population resides below this value, wherein particle size is measured using microscopy/image analysis techniques and the particle size distribution is reported as a number distribution.

In embodiments herein, Dn90 is defined as the particle size value at which 90% of the particle population resides below this value, wherein particle size is measured using microscopy/image analysis techniques and the particle size distribution is reported as a number distribution.

In embodiments herein, the particle size distribution width or "span" is defined as Span=$(Dn90-Dn10)/(Dn50)$, wherein particle size is measured using microscopy/image analysis techniques and the particle size distribution is reported as a number distribution.

In a specific embodiment, the $BaSO_4$ pigment selected has a median particle size Dn50 of about 400 nanometers. With diameter of the particle meaning the diameter measured along with longest axis, in embodiments along the longest axis of a particle having a generally ellipse shape, in embodiments, the Dn50 median particle diameter of the $BaSO_4$ pigment is about 400 nanometers. In embodiments, the Dn10 particle diameter of the $BaSO_4$ pigment is about 150 nanometers. In embodiments, the Dn90 particle diameter of the $BaSO_4$ pigment is about 550 nanometers. In embodiments, the particle size distribution width or "span" is 1.

In a specific embodiment, the $BaSO_4$ pigment selected has a median particle size Dn50 of about 400 nanometers. With diameter of the particle meaning the diameter measured along with longest axis, in embodiments along the longest axis of a particle having a generally ellipse shape, in embodiments, the Dn50 median particle diameter of the $BaSO_4$ pigment is about 400 nanometers. In embodiments, the Dn10 particle diameter of the $BaSO_4$ pigment is about 250 nanometers. In embodiments, the Dn90 particle diameter of the $BaSO_4$ pigment is about 550 nanometers. In embodiments, the particle size distribution width or "span" is 0.75.

The particle size distribution width or span values for the $BaSO_4$ pigment particles indicate that the particles are made to have a very wide particle size distribution. A wide particle size distribution width or span of greater than 0.75 can significantly enhance the overall solar reflectance compared to a uniform particle size distribution. For further detail, regarding particle size distribution of $BaSO_4$ pigments, see Li, et al., "Ultrawhite $BaSO_4$ Paints and Films For Remarkable Daytime Subambient Radiative Cooling," ACS Appl. Mater. Interfaces 2021, 13, 21733-21739, incorporated by reference herein above.

In a specific embodiment, the aqueous inkjet ink composition comprises water; an optional co-solvent; an optional dispersant; an optional resin, an optional wax; and a pigment, wherein the pigment consists essentially of a $BaSO_4$ pigment; wherein a particle size distribution is defined as Span=(Dn90–Dn10)/(Dn50), and wherein the $BaSO_4$ pigment has a wide particle size distribution wherein the Span is 0.75 or greater. In this embodiment, the ink is free of, that is, does not contain, any other pigments besides the $BaSO_4$ pigment. That is, the pigment consists essentially of the $BaSO_4$ pigment and the ink is free of other pigment. The single wide particle size distribution $BaSO_4$ pigment is not part of an extender or filler composition but rather is provided as the sole pigment in the aqueous inkjet ink composition.

In embodiments, the $BaSO_4$ particles have a wide particle size distribution. In embodiments, $BaSO_4$ particles are selected which are characterized by SEM (Scanning Electron Micrography) to have a particle size distribution with Dn50=400 nm, Dn10=250 nm and Dn90=550 nm and a span of 0.75

In embodiments, the $BaSO_4$ particles have a wide particle size distribution. In embodiments, $BaSO_4$ particles are selected which are characterized by SEM (Scanning Electron Micrography) to have a particle size distribution with Dn50=400 nm, Dn10=150 nm and Dn90=550 nm, and a span of 1.0.

The $BaSO_4$ pigment can be present in the aqueous inkjet ink composition in any suitable or desired amount. In embodiments, the $BaSO_4$ pigment is present in the aqueous inkjet ink composition in an amount of from about 1 percent to about 25 percent by weight based upon the total weight of the aqueous inkjet ink composition (that is, the total weight of all of the inkjet ink composition ingredients).

In certain embodiments, the $BaSO_4$ pigment is present in the aqueous inkjet ink composition in an amount of from about 10 to about 15 percent by weight based upon the total weight of the ink composition.

In embodiments, the aqueous inkjet ink compositions comprise a solvent system comprising water; a $BaSO_4$ pigment; and resin particles. Other components may be included, such as a colorant, a wax, and other additives. These components are described in detail below.

Solvent System.

As noted above, the aqueous inkjet ink composition comprises water. In embodiments, the amount of water used is in a range of from 40 weight % to 70 weight % as compared to the total weight of the aqueous inkjet ink composition. This includes from 50 weight % to 70 weight %, from 40 weight % to 60 weight %, from 40 weight % to 50 weight %, and from 50 weight % to 60 weight %.

In embodiments, the water is one component of a solvent system also comprising a water-soluble or water-miscible organic solvent. In embodiments, a first such organic solvent is used. The first organic solvent may be a diol. The diol may be an alkanediol having 2, 3, or 4 carbon atoms. The alkane diol may be a branched alkanediol. An illustrative branched alkanediol is propylene glycol. A single type or combinations of different types of the first organic solvent may be used. The total amount of the first organic solvent may be present in the aqueous inkjet ink composition in an amount of from 10 weight % to 40 weight % as compared to the total weight of the aqueous inkjet ink composition. This includes from 15 weight % to 40 weight %, and from 20 weight % to 40 weight %.

In embodiments, the first organic solvent is not a pyrrolidone, e.g., 2-pyrrolidone; dipropylene glycol monomethyl ether; tetrahydrofurfuryl alcohol; or propylene glycol monopropyl ether. In such embodiments, the aqueous inkjet ink composition is free of (i.e., does not comprise) each of these compounds.

In embodiments, a second organic solvent is used in the solvent system. The second organic solvent may also be a diol, but one that is different from the first organic solvent. As shown in the Examples, below, it has been determined that the colloidal stability of the aqueous inkjet ink composition is highly sensitive to the presence of the second organic solvent. In embodiments, the second organic solvent is an alkanediol. The alkanediol may have from 2 to 8 carbon atoms, i.e., 2, 3, 4, 6, 7, or 8 carbon atoms. In embodiments, the alkanediol has more than 4 carbon atoms, e.g., 5, 6, 7, or 8. The alkanediol may be a linear or branched alkanediol. The two hydroxy groups may assume any position on the alkanediol. Illustrative linear alkanediols include the following: ethylene glycol, triethyleneglycol, 1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,4-pentanediol, 1,2-hexanediol, 1,3-hexanediol, 1,6-hexanediol, 2,5-hexanediol, 1,2-heptanediol, 1,3-heptanediol, 1,7-heptanediol, 1,2-octanediol, 1,3-octanediol, 1,5-octanediol, 1,6-octanediol, 1,7-octanediol, 1,8-octanediol, 2,4-octanediol, 1,3,6-octanediol. Other illustrative alkanediols include 2-methyl-2,4-pentanediol, 3-methyl-1,5-pentanediol, 2-ethyl-1,3-hexanediol, diethylene glycol, 3-methyl-1,3 butanediol, 2-ethyl-1,3-hexanediol, 2-butyl-2-ethyl-1,3-propanediol, 2,5-dimethyl-hexanediol, and 2,2,4-trimethyl-1,3-pentanediol.

In embodiments, the second organic solvent is a hexanediol, including any of the hexanediols described above. In embodiments, the second organic solvent is 1,2-hexanediol. In embodiments, the second organic solvent is not 1,6- hexanediol. In such embodiments, the aqueous inkjet ink composition is free of (i.e., does not comprise) 1,6-hexanediol.

A single type or combinations of different types of the second organic solvent may be used. The total amount of the second organic solvent may be present in the aqueous inkjet ink composition in an amount of from greater than 0 weight % to 8 weight % as compared to the total weight of the aqueous inkjet ink composition. This includes from greater than 0 weight % to 6 weight %, greater than 0 weight % to 5 weight %, from 2 weight % to 6 weight %, from 3 weight % to 6 weight %, and from 3 weight % to 5 weight %.

In embodiments, the solvent system consists of the water, the first organic solvent, and the second organic solvent. In such embodiments, any of the first and second organic solvents described above may be used. Any of the amounts for the water and the first and second organic solvents described above may be used.

In embodiments, the optional co-solvent is present and the optional co-solvent comprises one or more organic solvents. In further embodiments, the optional co-solvent is present and the optional co-solvent comprises: a first organic solvent, and a second organic solvent, wherein the first organic solvent is a diol. In further embodiments, the optional co-solvent is present and the optional co-solvent comprises: a first organic solvent, and a second organic solvent, wherein the first organic solvent is propylene glycol. In further embodiments, the optional co-solvent is present and the optional co-solvent comprises: a first organic solvent, and a second organic solvent, wherein the second organic solvent is an alkanediol having from 2 to 8 carbon atoms. In further embodiments, the optional co-solvent is present and the optional co-solvent comprises: a first organic solvent, and a second organic solvent, wherein the second organic solvent is a hexanediol.

Resin Particles.

The aqueous inkjet ink composition also comprises resin particles. The resin particles are synthesized from various monomers to form a polymeric material from which the resin particles are composed. The types of monomers, and hence, polymeric material, is not particularly limited. However, by way of illustration, the following monomers and combinations thereof may be used (use of "(meth)" as in, e.g., "(meth)acrylate", refers to both acrylate and methacrylate): styrene; alkyl (meth)acrylates, such as, methyl acrylate, ethyl acrylate, butyl acrylate, isobutyl acrylate, dodecyl acrylate, n-octyl acrylate, 2-chloroethyl acrylate, methyl methacrylate, ethyl methacrylate and butyl methacrylate; β-carboxy ethyl acrylate (β-CEA), phenyl acrylate, methyl alphachloroacrylate; butadiene; isoprene; methacrylonitrile; acrylonitrile; vinyl ethers, such as vinyl methyl ether, vinyl isobutyl ether, and vinyl ethyl ether; vinyl esters, such as vinyl acetate, vinyl propionate, vinyl benzoate and vinyl butyrate; vinyl ketones, such as vinyl methyl ketone, vinyl hexyl ketone and methyl isopropenyl ketone; vinylidene halides, such as vinylidene chloride and vinylidene chlorofluoride; N-vinyl indole; N-vinyl pyrrolidone; methacrylate; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylene; and isobutylene. In embodiments, the monomers used to form the resin particles comprise a styrene and an alkyl acrylate.

Acidic monomers may be used to form the resin particles, including (meth)acrylic acid monomers, sulfonic acid monomers, sulfonate monomers, and combinations thereof. Illustrative acidic monomers include acrylic acid, methacrylic acid, ethacrylic acid, dimethylacrylic acid, maleic anhydride, maleic acid, styrenesulfonic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof. These acidic monomers also encompass salts thereof, e.g., salt of a sulfonic acid.

Two different acidic monomers may be used to form the resin particles, each having a different pKa value. This is useful to improve colloidal stability over a wide range of pH and a wide range of pigment grades. The pKa values of the two different acidic monomers may differ from one another by at least 2 units, at least 3 units, at least 4 units, or at least 5 units. In embodiments, the two different acidic monomers are present in a monomer emulsion used to form the resin particles at a weight ratio in a range of from 0.1 to 10. This includes a range of from 0.5 to 8 and from 1 to 6. In embodiments, the two different types of acidic monomers used to form the resin particles comprise a methacrylic acid and a sulfonic acid.

Hydrophilic monomers may be used to form the resin particles. The term "hydrophilic monomer" is distinguished from the "acidic monomers" described above. That is, although the selected acidic monomers may also be hydrophilic, these terms refer to different, chemically distinct species of monomers. The hydrophilic monomers are generally monofunctional, i.e., comprising a single polymerizable group. Suitable hydrophilic monomers are those capable of absorbing relatively significant amounts of water via hydrogen bonds formed between water and hydrogen bonding moieties of the hydrophilic monomers. Hydroxyl moieties and glycol moieties are illustrative hydrogen bonding moieties. For example, poly(ethylene glycol)- and poly(propylene glycol)-based hydrophilic monomers are particularly useful as the glycol-containing chains are capable of absorbing significant amounts of water. Suitable hydrophilic monomers are also those that polymerize near the surface of the resin particles such that the hydrogen bonding moieties extend from the surface of the resin particles into a surrounding aqueous medium.

As noted above, illustrative hydrophilic monomers include those comprising hydroxyl moieties, such as hydroxyethyl (meth)acrylate, n-hydroxyethyl (meth)acrylamide, hydroxypropyl (metha)crylate, and hydroxypropyl (meth)acrylamide. Other illustrative hydrophilic monomers include those comprising glycol moieties, such as ethylene glycol (meth)acrylate and propylene glycol (meth)acrylate. Poly(ethylene glycol) (meth)acrylate and poly(propylene glycol) (meth)acrylate are other examples. In embodiments, the hydrophilic monomer is poly(ethylene glycol) (meth)acrylate having a molecular weight in a range of from 185 g/mol to 1500 g/mol. This includes a range of from 360 g/mol to 1500 g/mol, and from 500 g/mol to 1000 g/mol. In embodiments, the hydrophilic monomer is poly(propylene glycol) (meth)acrylate having a molecular weight in a range of from 260 g/mol to 1000 g/mol. This includes a range of from 360 g/mol to 1000 g/mol, and from 500 g/mol to 1000 g/mol. Gel permeation chromatography may be used to determine these molecular weights.

Multifunctional monomers may be used to form the resin particles, i.e., those comprising more than one polymerizable group (e.g., 2, 3, 4). These are useful as they facilitate crosslinking within the resin particles. Illustrative multifunctional monomers include difunctional monomers such as a poly(ethylene glycol) di(meth)acrylate, e.g., poly(ethylene glycol) diacrylate having a molecular weight of 250 g/mol. Other poly(ethylene glycol) di(meth)acrylates may be used, including those having a molecular weight in a range of from 214 g/mol to 1000 g/mol, from 214 g/mol to 500 g/mol, and from 214 g/mol to 300 g/mol. These difunctional monomers may also be considered to be hydrophilic as noted above. Again, gel permeation chromatography may be used to determine these molecular weights. Other hydrophilic difunctional monomers include a diacrylate compound bonded with an alkyl chain containing an ether bond, such as diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds obtained by substituting acrylate of these compounds with methacrylate; a diacrylate compound bonded with a chain containing an aromatic group and an ether bond, such as polyoxyethylene(2)-2,2-bis(4-hydroxyphenyl)propane diacrylate, polyoxyethylene(4)-2,2-bis(4-hydroxyphenyl)propane diacrylate, and compounds obtained by substituting acrylate of these compounds with methacrylate. Other difunctional monomers include a diene compound, such as isoprene and butadiene, an aromatic divinyl compound, such as divinylbenzene and divinylnaphthalene; a diacrylate compound bonded with an alkyl chain, such as ethylene glycol diacrylate, 1,3-butylene glycol diacrylate, 1,4-butanediol diacrylate, 1,5-pentanediol diacrylate, 1,6-hexanediol diacrylate, 1,10-dodecanediol diacrylate, neopentyl glycol diacrylate, and compounds obtained by substituting acrylate of these compounds with methacrylate. Multifunctional monomers include pentaerythritol triacrylate, trimethylolmethane triacrylate, trimethylolpropane triacrylate, tetramethylolmethane tetraacrylate, oligoester acrylate, and compounds obtained by substituting acrylate of these compounds with methacrylate.

Reactive surfactants may be used to form the resin particles. Suitable reactive surfactants comprise a polymerizable (and thus, reactive) group such that they become incorporated into the resin particles. Illustrative reactive surfactants include anionic ether sulfate reactive surfactants such as those in the commercially available Hitenol BC series such as Hitenol BC10-25. Other suitable reactive surfactants include polyoxyethylene alkylphenyl ether ammonium sulfate, Hitenol BC-10, BC-20, BC-2020, BC-30; polyoxyethylene styrenated phenyl ether ammonium sulfate including Hitenol AR-10, AR-20, AR10-25, AR-2020; non-ionic polyoxyethylene alkylphenyl ether including Noigen® RN-10, RN-20, RN-30, RN-40, RN-5065; and reactive surfactant available from Ethox including E-Sperse® RX-201, RX-202, RX-203, RS-1596, RS-1616, RS-1617, RS-1618, RS-1684.

A chain transfer agent may be used to form the resin particles. The chain transfer agent may be a mercaptan or a thiol. Suitable chain transfer agents include n-dodecylmercaptan (NDM), n-dodecanethiol (DDT), tert-dodecylmercaptan, 1-butanethiol, 2-butanethiol, octanethiol, and combinations thereof. Halogenated carbons such as carbon tetrabromide, carbon tetrachloride, and combinations thereof may be used as chain transfer agents.

In forming the resin particles, any of the monomers described above may be used in a monomer emulsion comprising a solvent. Water is generally used as the solvent, but water-soluble or water-miscible organic solvents (e.g., ethanol) may also be included. The type of monomers and their relative amounts may be selected to tune the properties of the resin particles.

Acidic monomers may be used in the monomer emulsion in an amount in a range of from 1.5 weight % to 15 weight %. (Here, weight % refers to the (total weight of acidic monomers)/(total weight of monomers in the monomer emulsion, excluding the reactive surfactants)*100). This range includes from 5 weight % to 10 weight %. As noted above, two different types of acidic monomers having different pKa values may be used in the weight ratios described above. Hydrophilic monomers may be used in the monomer emulsion an amount in a range of from 1 weight % to 15 weight %. (Weight % has a meaning analogous to that described for acidic monomers.) This range includes from 2 weight % to 15% weight % and from 5 weight % to 15 weight %. Multifunctional monomers, including difunctional monomers, may be used in the monomer emulsion in similar amounts. In embodiments, the amount is in a range of from 0.01 weight % to 0.8 weight %, from 0.03 weight % to 0.3 weight % or from 0.4 weight % to 0.6 weight %. Other monomers, (e.g., styrenes, alkyl (meth)acrylates) may be present in an amount in a range of from 70 weight % to 97 weight %. (Weight % has a meaning analogous to that described for acidic monomers.) This range includes from 75 weight % to 90 weight %.

Together, the amount of acidic monomers, hydrophilic monomers, and multifunctional monomers (e.g., hydrophilic multifunctional monomers) may be present in the monomer emulsion a range of from 10 weight % to 30 weight %. (Here, weight % refers to the (total weight of acidic monomers, hydrophilic monomers, and multifunctional monomers)/(total weight of monomers in the monomer emulsion, excluding the reactive surfactants)*100). This range includes from 15 weight % to 30 weight % and from 15 weight % to 25 weight %.

Reactive surfactants may be used in the monomer emulsion an amount in a range of from 1.5 weight % to 6.5 weight %. (Here, weight % refers to the (total weight of reactive surfactants)/(total weight of monomers in the monomer emulsion, including the reactive surfactant monomers) *100). This range includes from 1.5 weight % to 5 weight %.

The chain transfer agent(s) may be present in the monomer emulsion and may be used in various suitable amounts, for example, from 0.25 weight % to 2.5 weight %. (Here, weight % refers to the (total weight of chain transfer agents)/(total weight of monomers in the monomer emulsion, excluding the reactive surfactants)*100.)

In embodiments, the monomer emulsion comprises (or consists of) a solvent (e.g., water), a styrene, an alkyl acrylate (e.g., butyl acrylate), an acidic monomer, a hydrophilic monomer, a multifunctional (e.g., a difunctional monomer), a reactive surfactant, and a chain transfer agent. In such embodiments, one type or different types of the various monomers may be used. Similarly, one type or different types of the solvent and/or one type or different types of the chain transfer agent may be used. In embodiments, the monomer emulsion comprises (or consists of) a solvent (e.g., water), a styrene, an alkyl acrylate (e.g., butyl acrylate), two different types of acidic monomers (e.g., a methacrylic acid and a sulfonic acid), a hydrophilic monomer (e.g., hydroxyethyl acrylate), a difunctional monomer (e.g., a poly(ethylene glycol) diacrylate), a reactive surfactant, and a chain transfer agent. In any of these embodiments, amounts of the various monomers and chain transfer agents may be used as described above. The balance may be made up of the solvent.

At least in embodiments, the monomer emulsion is free of (i.e., does not comprise) a surfactant. Here, "surfactant" refers to non-reactive, non-polymerizable anionic surfactants such as sodium dodecylsulfate (SDS), sodium dodecylbenzene sulfonate, sodium dodecylnaphthalene sulfate; dialkyl benzenealkyl sulfates; palmitic acid; alkyldiphenyloxide disulfonate; and branched sodium dodecyl benzene sulfonate. "Surfactant" also refers to non-reactive, non-polymerizable cationic surfactants such as alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromide, halide salts of quarternized polyoxyethylalkylamines, and dodecylbenzyl triethyl ammonium chlorides. "Surfactant" also refers to non-reactive, non-polymerizable nonionic surfactants such as polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy) ethanol, and block copolymer of polyethylene oxide and polypropylene oxide. Thus, the monomer emulsion may be free of (i.e., does not comprise) any of these surfactants.

Processing steps for forming the resin particles may comprise adding any of the monomer emulsions described above to a reactive surfactant solution at a feed rate over a period of time. The reactive surfactant solution comprises a solvent and a reactive surfactant. Any of the solvents and any of the reactive surfactants described above may be used. One type or different types of solvent and/or reactive surfactants may be used. The reactive surfactant in the reactive surfactant solution may be the same type or a different type as compared to a reactive surfactant that may be present in the monomer emulsion. The reactive surfactant solution may further comprise a buffer. Various buffers may be used such as sodium bicarbonate, sodium carbonate, and ammonium hydroxide. The reactive surfactant may be used in an amount in a range of from 1 weight % to 10 weight %. (Here, weight % refers to the (total weight of reactive surfactants)/(total weight of reactive surfactant solution)*100.) This range includes from 2 weight % to 5 weight %. The buffer may be used in an amount in a range of from 0.25 weight % to 2.5 weight %. (Weight % has a meaning analogous to that described above.)

An initiator may be included in the reactive surfactant solution. Alternatively, a separate initiator solution comprising the initiator and any of the solvents described above may be formed and the separate initiator solution added to the reactive surfactant solution. The separate initiator solution may be added prior to the addition of the monomer emulsion. An additional amount of a separate initiator solution may be added after the addition of the monomer emulsion. One type or different types of solvent and/or initiators may be used. Examples of suitable initiators include water soluble initiators, such as ammonium persulfate (APS), sodium persulfate and potassium persulfate; and organic soluble initiators including organic peroxides and azo compounds including Vazo™ peroxides, such as VAZO 64™, 2-methyl 2-2'-azobis propanenitrile, VAZO 88™, 2-2'-azobis isobutyramide dehydrate; and combinations thereof. Other water-soluble initiators which may be used include azoamidine compounds, for example 2,2'-azobis(2-methyl-N-phenylpropionamidine) dihydrochloride, 2,2'-azobis[N-(4-chlorophenyl)-2-methylpropionamidine]di-hydrochloride, 2,2'-azobis[N-(4-hydroxyphenyl)-2-methylpropionamidine]dihydrochloride, 2,2'-azobis[N-(4-aminophenyl)-2-methylpropionamidine]tetrahydrochloride, 2,2'-azobis[2-methyl-N-(phenylmethyl)propionamidine] dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]di-hydrochloride, 2,2'-azobis{2-[1-(2-hydroxyethyl)-2-imidazolin-2-yl]propane}dihydrochloride, and combinations thereof. The initiator may be used in an amount in a range of from 0.1 weight % to 2.5 weight %. (Here, weight % refers to the (total weight of initiators)/(total weight of reactive surfactant solution)*100.)

Silica nanoparticles may be included in the reactive surfactant solution. Silica nanoparticles may become bound to hydrogen bonding moieties of the hydrophilic monomers and/or water molecules bound to the hydrogen bonding moieties. The use of silica nanoparticles is beneficial, at least in part, since a smaller amount of a non-silica white pigment (e.g., titanium dioxide) may then be used in the aqueous inkjet ink composition. Rather than including the silica nanoparticles during the polymerization process, the silica nanoparticles may be included as an additive when making the aqueous inkjet ink composition as described below.

The size of the silica nanoparticles used is generally quite small, e.g., silica nanoparticles having a D50 particle size of no greater than 100 nm, no greater than 50 nm, or in a range of from 5 nm to 50 nm may be used. Silica nanoparticles may be included in the reactive surfactant solution at an amount in a range of from 0.5 weight % to 5 weight %. (Here, weight % refers to the total weight of silica nanoparticles)/(total weight of reactive surfactant solution)*100. The total weight of silica nanoparticles refers to solid weight, rather than the weight of a silica nanoparticle dispersion/solution. Commercially available silica nanoparticles which may be used include the following: various grades of LUDOX® Colloidal Silica such as FM, SM, HS-30, HS-40, LS, TM-40, TM-50, SM-AS, AS-30, AS-40, AM, HSA, TMA, P X-30, P t-40, P W-50, CL, and CL-P; and various grades of Nissan Chemical Silica such as SNOWTEX® ST-20L, ST-30, ST-40, ST-50, ST-OS, ST-O, ST-O-40, ST-OL, ST-C, ST-C-30, ST-CM, ST-N, STN30G, ST-N40, ST-NS, ST-XS, ST-S, ST-UP, ST-O-UP, MA-ST-UP, ST-PS-S, AMT-3305, HX-305M1, and HX-305M5.

In embodiments, the reactive surfactant solution comprises (or consists of) a solvent (e.g., water), a reactive surfactant, and optionally, one or more of an initiator, a buffer, and silica nanoparticles. In such embodiments, one type or different types of these components may be used. In any of these embodiments, amounts of the reactive surfactants, initiator, buffer, and silica nanoparticles may be used as described above. The balance may be made up of the solvent. At least in some embodiments, the reactive surfactant solution is free of (i.e., does not comprise) any of the surfactants described above. In at least some embodiments, the reactive surfactant solution is free of (i.e., does not comprise) any monomers, other than the reactive surfactant monomer(s) present in the solution.

The addition of the monomer emulsion to the reactive surfactant solution may be carried out under an inert gas (e.g., nitrogen) and at an elevated temperature (e.g., greater than room temperature such as a temperature in a range of from 50° C. to 90° C.). This may be accomplished by purging with the inert gas and heating the reactive surfactant solution prior to the addition of the monomer emulsion and continuing during the addition of the monomer emulsion.

As noted above, the monomer emulsion may be added at a feed rate over a period of time. In the presence of the initiator, the monomers of the monomer emulsion undergo polymerization reactions to form the resin particles of the latex. The feed rate is generally sufficiently slow so that the polymerization is carried out under "monomer-starved" conditions. This means that the feed rate is no greater than the rate the polymerization reactions, e.g., between styrene and acrylate monomers. Illustrative feed rates include those in a range of from 1 mL/min to 10 mL/min based on a total reaction volume of 1 L. Illustrative periods of time include those in a range of from 60 minutes to 600 minutes. After the monomer emulsion has been added, the polymerization may be allowed to continue for an additional period of time, with or without the addition of additional initiator. Illustrative additional periods of time include those in a range of from 1 hour to 18 hours. Both the addition of the monomer emulsion and the polymerization after addition may be carried out under the inert gas and at the elevated temperature. The result of the processing steps described above is a latex comprising the resin particles. The latex may be used as is, or may be processed by standard techniques such as coagulation, dissolution and precipitation, filtering, washing, or drying.

In embodiments, the methods for forming the resin particles do not involve the use of a resin seed in forming the resin particles. In such embodiments, neither the monomer emulsion nor the reactive surfactant solution comprises such a resin seed. The polymerization reactions that form the resin particles also do not involve such a resin seed. Similarly, at least in embodiments, the present methods do not involve the use of any of the surfactants (other than the reactive surfactant monomers) described above. In other embodiments, the methods for forming the resin particles may make use of a resin seed, e.g., in order to initiate and stabilize polymerization.

The methods may further comprise forming the monomer emulsion, forming the reactive surfactant solution, and/or forming the initiator solution. Each may be formed by combining the desired components at the desired amounts and mixing.

In embodiments, the optional resin is present and comprises resin particles comprising a polymerization product of reactants comprising a monomer, an acidic monomer, a hydrophilic monomer, a multifunctional monomer, and a reactive surfactant. In embodiments, the resin particles further comprise silica nanoparticles.

The composition of the resin particles depends upon the selection of the monomers and their relative amounts, as well as the polymerization reactions between selected monomers that produce a polymerization product as described above. Thus, a variety of compositions are encompassed, including those based on various polymerization products of reactants comprising various combinations of monomers. As noted above, the selection of monomers is not particularly limited. However, in embodiments, the resin particles comprise (or consist of) the polymerization product (e.g., a copolymer) of reactants comprising a styrene, an alkyl acrylate (e.g., butyl acrylate), an acidic monomer, a hydrophilic monomer, a multifunctional monomer (e.g., a difunctional monomer), and a reactive surfactant. In such embodiments, one type or different types of the various monomers may be present. In embodiments, the resin particles comprise (or consist of) the polymerization product of reactants comprising a styrene, an alkyl acrylate (e.g., butyl acrylate), two different types of acidic monomers (e.g., a methacrylic acid and a sulfonic acid), a hydrophilic monomer (e.g., hydroxyethyl acrylate), a difunctional monomer (e.g., a poly(ethylene glycol) diacrylate), and a reactive surfactant. In each of these embodiments, an initiator may be incorporated at the beginning and end of each polymer chain in the resin particles. In each of these embodiments, the resin may be crosslinked due to the multifunctional/difunctional monomer. In each of these embodiments, the monomers may be present in the resin particles in the amounts described above. For example, together, the amount of the acidic monomer, the hydrophilic monomer, and the multifunctional monomer, may be in a range of from 10 weight % to 30 weight % in the resin particles. As above, this weight % refers to the (total weight of acidic monomers, hydrophilic monomers, and multifunctional monomers)/(total weight of monomers in the resin particles, excluding the reactive surfactants)*100.

The resin particles may be characterized by their size and size distribution. The resin particles may have a relatively small size and narrow size distribution. The size of the resin particles may be reported as a D(z, ave) value, measured using a nanoparticle analyzer such as a Malvern Nano-Zetasizer. In embodiments, the D(z, ave) is no greater than 200 nm, no greater than 190 nm, no greater than 180 nm, no greater than 170 nm, or in a range of from 80 nm to 200 nm. The size distribution may be reported as a polydispersity index (PDI), measured using a nanoparticle analyzer such as a Malvern Nano-ZS. In embodiments, the PDI is no greater than 0.1, no greater than 0.050, no greater than 0.040, no greater than 0.035, no greater than 0.030 or in a range of from 0.001 to 0.1.

Due to their small size and narrow size distribution, the resin particles may further be characterized as being free of (i.e., not comprising) large particles. This may be evidenced by a D(v, 90) value of less than 200 nm, less than 175 nm, or less than 150 nm.

The small size and narrow size distribution of the resin particles may be further evidenced by the ability to form of three-dimensional (3D) photonic crystals upon removal of solvent (i.e., drying) from a latex comprising the resin particles. Such crystal formation is possible because of the uniform size distribution of the resin particles. Local crystallization and the ability to form the 3D photonic crystals may be confirmed using scanning tunneling electron microscopy (STEM). Controlled heating may be used to achieve the 3D photonic crystals.

The resin particles may be present in the aqueous inkjet ink composition in various amounts, including an amount in a range of from 1 weight % to 10 weight %. (Here, weight % refers to the (total weight of resin particles)/(total weight of aqueous inkjet ink composition)*100.) This range includes from 1 weight % to 6 weight %. Although combinations of different types of resin particles may be used, in embodiments, the aqueous inkjet ink composition comprises a single type of the resin particles.

Colorant.

In addition to the $BaSO_4$ pigment, the aqueous inkjet ink composition may comprise a colorant. Colorants include pigments, dyes, and combinations thereof. Examples of suitable dyes include anionic dyes, cationic dyes, nonionic dyes, and zwitterionic dyes. Specific examples of suitable dyes include Food dyes such as Food Black No. 1, Food Black No. 2, Food Red No. 40, Food Blue No. 1, Food Yellow No. 7, FD & C dyes, Acid Black dyes (No. 1, 7, 9, 24, 26, 48, 52, 58, 60, 61, 63, 92, 107, 109, 118, 119, 131, 140, 155, 156, 172, 194), Acid Red dyes (No. 1, 8, 32, 35, 37, 52, 57, 92, 115, 119, 154, 249, 254, 256), Acid Blue dyes (No. 1, 7, 9, 25, 40, 45, 62, 78, 80, 92, 102, 104, 113, 117, 127, 158, 175, 183, 193, 209), Acid Yellow dyes (No. 3, 7, 17, 19, 23, 25, 29, 38, 42, 49, 59, 61, 72, 73, 114, 128, 151), Direct Black dyes (No. 4, 14, 17, 22, 27, 38, 51, 112, 117, 154, 168), Direct Blue dyes (No. 1, 6, 8, 14, 15, 25, 71, 76, 78, 80, 86, 90, 106, 108, 123, 163, 165, 199, 226), Direct Red dyes (No. 1, 2, 16, 23, 24, 28, 39, 62, 72, 236), Direct Yellow dyes (No. 4, 11, 12, 27, 28, 33, 34, 39, 50, 58, 86, 100, 106, 107, 118, 127, 132, 142, 157), Reactive Dyes, such as Reactive Red Dyes (No. 4, 31, 56, 180), Reactive Black dyes (No. 31), Reactive Yellow dyes (No. 37); anthraquinone dyes, monoazo dyes, disazo dyes, phthalocyanine derivatives, including various phthalocyanine sulfonate salts, aza(18)annulenes, formazan copper complexes, and triphenodioxazines.

Examples of suitable pigments include black pigments, cyan pigments, magenta pigments, and yellow pigments. Pigments can be organic or inorganic particles. Suitable inorganic pigments include carbon black. However, other inorganic pigments may be suitable such as cobalt blue ($CoO-Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, and anthanthrone pigments such as PR168. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH® 1400, MONARCH® 1300, MONARCH® 1100, MONARCH® 1000, MONARCH® 900, MONARCH® 880, MONARCH® 800, MONARCH® 700, CAB-O-JET® 200, CAB-O-JET® 300, CAB-O-JET® 450, REGAL®, BLACK PEARLS®, ELFTEX®, MOGUL®, and VULCAN® pigments; Columbian pigments such as RAVEN® 5000, and RAVEN® 3500; Evonik pigments such as Color Black FW 200, FW 2, FW 2V, FW 1, FW18, FW 5160, FW 5170, Special Black 6, Special Black 5, Special Black 4A, Special Black 4, PRINTEX® U, PRINTEX® 140U, PRINTEX® V, and PRINTEX® 140V. Other pigments include CAB-O-JET® 352K, CAB-O-JET® 250C, CAB-O-JET® 260M, CAB-O-JET® 270Y, CAB-O-JET® 465M, CAB-O-JET® 470Y and CAB-O-JET® 480V (available from Cabot Corporation).

If used, the colorant may be present in the aqueous inkjet ink composition at various amounts. In embodiments, the colorant is present at an amount in the range of from 0.01 weight % to 5 weight % as compared to the total weight of the aqueous inkjet ink composition. This includes from 0.01 weight % to 2 weight % and from 0.01 weight % to 1 weight %. If more than one type of colorant is used, these amounts refer to the total amount of colorant. These amounts refer to solids content as opposed to the amount of a dispersion comprising the colorant.

In embodiments, in addition to the white pigment, the aqueous inkjet ink composition comprises a black colorant, a cyan colorant, or combinations thereof. Inclusion of such colorants in the white-pigment containing aqueous inkjet ink compositions is useful to provide grey aqueous inkjet ink compositions. In embodiments, the colorants in the aqueous inkjet ink compositions consist of the white pigment, and optionally, one or more of a black colorant and a cyan colorant. In such embodiments, any of the white pigments, black colorants, and cyan colorants described above may be used. Any of the amounts for the white pigment, black colorant, and cyan colorant described above may be used.

Wax.

The aqueous inkjet ink composition may comprise a wax. Illustrative waxes include paraffin waxes, polyethylene waxes, polypropylene waxes, microcrystalline waxes, polyolefin waxes, montan based ester waxes and carnauba waxes. Waxes having a melting point in a range of from 50° C. to 150° C. may be used. Nanoscale (e.g., diameter of 1000 nm or less, 500 nm or less, or 100 nm or less) wax emulsions based on carnauba wax and paraffin wax may be used. Waxes such as those from Michelman may be used (e.g., Michem Lube 103DI, 124, 124P135,156, 180, 182, 190, 270R, 368, 511, 693, 723, 743, 743P, and 985; and Michem Emulsion 24414, 34935, 36840, 41740, 43040, 43240, 44730, 47950, 48040M2, 61355, 62330, 66035, 67235, 70750, 71150, 71152, 91735, 93235, 93335, 93935, and 94340). Waxes from Byk may also be used, including Aquacer® 2500, Aquacer® 507, Aquacer® 513, Aquacer® 530, Aquacer® 531, Aquacer® 532, Aquacer® 535, Aquacer® 537, Aquacer® 539, and Aquacer® 593.

It has been found that nanoscale wax emulsions based on charged waxes (e.g., anionic waxes) are particularly useful. An illustrative such wax is Michem® Lube 190.

In embodiments, the optional wax is present; and the optional wax comprises a member selected from the group consisting of paraffin wax, polyethylene wax, polypropylene wax, microcrystalline wax, polyolefin wax montan based ester wax, carnauba wax, and combinations thereof.

If used, the wax may be present in the aqueous inkjet ink compositions at various amounts. In embodiments, the amount is in a range of from 0.1 weight % to 5 weight % as compared to the total weight of the aqueous inkjet ink composition. If more than one type of wax is used, these amounts refer to the total amount of wax. These amounts refer to solids content as opposed to the amount of a dispersion comprising the wax.

Surfactant.

The aqueous inkjet ink compositions may comprise a surfactant. Examples of suitable surfactants include anionic surfactants (such as sodium lauryl sulfate (SLS), Dextrol™ OC-40, Strodex™ PK 90, ammonium lauryl sulfate, potassium lauryl sulfate, sodium myreth sulfate and sodium dioctyl sulfosuccinate series), nonionic surfactants (Surfynol® 104 series, Surfynol® 400 series, Dynol™ 604, Dynol™ 607, Dynol™ 810, EnviroGem® 360, secondary alcohol ethoxylate series such as Tergitol™ 15-s-7, Tergitol™ 15-s-9, TMN-6, TMN-100× and Tergitol™ NP-9, Triton™ X-100, etc.) and cationic surfactants (Chemguard S-106A, Chemguard S-208M, Chemguard S-216M). Some fluorinated or silicone surfactants can be used such as PolyFox™ TMPF-136A, 156A, 151N, Chemguard S-761p, S-764p, Silsurf® A008, Siltec® C-408, BYK 345, 346, 347, 348 and 349, 3410, 333, 3455, 342, 333, 302, polyether siloxane copolymer TEGO® Wet-260, 270 500, etc, and TEGO® Tween 4000. Some amphoteric fluorinated surfactants can also be used such as alkyl betaine fluorosurfactant or alkyl amine oxide fluorosurfactant such as Chemguard S-500 and Chemguard 5-111.

If used, the surfactant may be present in the aqueous inkjet ink composition at various amounts. In embodiments, the surfactant is present in an amount in a range of from 0.01 weight % to 2 weight % as compared to the total weight of the aqueous inkjet ink composition. If more than one type of surfactant is used, these amounts refer to the total amount of surfactant.

Other Resins, Emulsions, Binders, Dispersants.

Although not required, the aqueous inkjet ink compositions may comprise a water-soluble resin or emulsion, a water-borne binder, a polymeric dispersant, or combinations thereof. A variety of water-soluble resins may be used such as polyethylene glycol and polyvinylpyrrolidone. A polyethylene glycol having a molecular weight in a range of from 3000 g/mol to 9000 g/mol, from 3000 g/mol to 7000 g/mol, from 3000 g/mol to 5000 g/mol, or 4000 g/mol may be used. These molecular weights may be measured using gel permeation chromatography.

Exemplary water-borne binders include Rhoplex™ 1-1955, Rhoplex™ I-2426D, Rhoplex™ 1-62, Rhoplex™ 1-98, Rhoplex™ E-1691, available from Rhohm & Haas. Others include Lucidene™ 190, Lucidene™ 400, and Lucidene™ 243, available from DSM Corporation; NeoCryl® A-1110, NeoCryl® A-2092, NeoCryl® A-639, NeoRad™ R-440, NeoRad™ R-441, NeoRez® N-55 under the name 972, PVP K-15, PVP K-30, PVP K-60, PVP K-85, Ganex™ P-904LC, PVP/VA W-63 available from ISP. Other exemplary water-borne binders include those available from Johnson Polymers (BASF) such as Joncryl® 537, Joncryl® H538, Joncryl® H538.

Polymeric dispersants which may be used include acrylic polymers such as styrene-acrylic copolymers and vinylpyrrolidone copolymers, urethane or polyurethane dispersions, and acrylic-urethane hybrid dispersions. More specific polymeric dispersants include those available from Johnson Polymers (BASF) such as Joncryl® 671, Joncryl® 683, Joncryl® 296, Joncryl® 690, Joncryl® HPD 296, Joncryl® HPD96-E, Joncryl® LMV 7085, and Joncryl® 8082. Other dispersants which may be used include those described in EP Patent No. 2097265, which is incorporated by reference for purposes of the dispersants, and those described in U.S. patent application Ser. No. 20190284414, which is incorporated by reference for purposes of the dispersants.

If present, various amounts of the components above may be used in the aqueous inkjet ink composition. In embodiments, the resin/emulsion/binder/dispersant is present in an amount in a range of from 0.01 weight % to 5 weight % as compared to the total weight of the aqueous inkjet ink composition. If combinations are used, or more than one type of a kind are used, these amounts refer to the total amount of resin/emulsion/binder/dispersant.

Additives.

Various additives may be used in the aqueous inkjet ink compositions to tune the properties thereof. Suitable additives include one or more of biocides; fungicides; stabilizers; pH controlling agents such as acids or bases, phosphate salts, carboxylates salts, sulfite salts, amine salts, buffer solutions; sequestering agents such as EDTA (ethylenediamine tetra acetic acid); humectants; defoamers; wetting agents; and the silica nanoparticles described above (e.g., if not already included during monomer polymerization).

Various amounts of the additives may be used in the aqueous inkjet ink compositions. In embodiments, the additives are present in an amount in a range of from 0.01 weight % to 5 weight % as compared to the total weight of the aqueous inkjet ink composition. If more than one type of additive is used, these amounts refer to the total amount of additives.

In at least embodiments, the present aqueous inkjet ink compositions are free of (i.e., do not comprise) a coagulant and are free of (i.e., do not comprise) a coalescing agent and are free of (i.e., do not comprise) a plasticizer. In embodiments, the ink compositions are free of (i.e., do not comprise) any pyrrolidone-based solvents such as N-methylpyrrolidone, and are free of (i.e., do not comprise) Texanol™ and Texanol™ isobutyrate (3-Hydroxy-2,2,4-trimethylpentyl isobutyrate).

In embodiments, the aqueous inkjet ink composition comprises (or consists of) a solvent system; a white $BaSO_4$ pigment; resin particles; and optionally, one or more of a colorant, a wax, and an additive. In embodiments, the aqueous inkjet ink composition comprises (or consists of) a solvent system; a white $BaSO_4$ pigment; resin particles; a wax; and optionally, one or more of a colorant and an additive. In embodiments, the solvent system consists of water, a first organic solvent, and a second organic solvent. In embodiments, the colorant may be present and may be selected from a black colorant, a cyan colorant, and combinations thereof. In embodiments, the additives may be selected from a stabilizer, a surfactant, a defoamer, a wetting agent, a humectant, and a biocide. In any of these embodiments, the components may be selected from any of the solvent systems, organic solvents, resin particles, white BaSO$_4$ pigments, colorants, waxes, and additives disclosed herein. In any of these embodiments, amounts of the components may be used as disclosed herein.

The aqueous inkjet ink compositions may be formed by combining the desired components at the desired amounts and mixing. An illustrative method comprises adding the BaSO$_4$ pigment (which may be provided as a dispersion) to water; adding the resin particles (which may be provided as a latex) to the water; adding the organic solvent(s) to the water; and adding any additives to the water. The organic solvent(s) and any additives may be combined together as a separate mixture before adding to the water. If a wax (which may be provided as a dispersion) is to be included, it may be added separately. The wax may be added after the addition of the organic solvents and additives. If a colorant is to be included, it has been determined that the colloidal stability of the aqueous inkjet ink composition is highly sensitive to the order of addition of the colorant. Specifically, any colorants (which may be added as separate or combined dispersion) are desirably added before addition of the BaSO$_4$ pigment. Mixing and/or heating may be used during the method. The aqueous inkjet ink composition may be filtered prior to use.

In embodiments, a process herein comprises: combining water; an optional co-solvent; an optional dispersant; an optional resin; an optional wax; and a BaSO$_4$ pigment; wherein a particle size distribution is defined as Span=(Dn90−Dn10)/(Dn50); and wherein the BaSO$_4$ pigment has a wide particle size distribution wherein the Span is greater than 0.75, to form an aqueous ink composition.

Properties.

The aqueous inkjet ink compositions may be characterized by their viscosities. The viscosity may be a mean shear viscosity as measured over a range of from 4 to 400 Hz and a temperature of 37° C. The mean shear viscosity may be measured using an ARES-G2 rheometer by TA Instruments. The number of measurements to provide the mean value may be 10. The mean shear viscosity values may refer to the aqueous inkjet ink composition having a white BaSO$_4$ pigment solids content in a range of from 4 weight % to 15 weight % as compared to the total weight of the aqueous inkjet ink composition. In embodiments, the mean shear viscosity is in a range of from 1 mPa·s to 8 mPa·s, 2 mPa·s to 7 mPa·s, or 3 mPa·s to 6 mPa·s. These viscosities are all initial viscosities, measured within a day after formation of the aqueous inkjet ink compositions.

In embodiments the aqueous inkjet ink compositions exhibit high long-term colloidal stability. Mean shear viscosity provides a measurement of the colloidal stability of the aqueous inkjet ink compositions. Embodiments of the aqueous inkjet ink compositions can exhibit mean shear viscosities that are very stable over extended periods of time and elevated temperatures. Specifically, embodiments of the aqueous inkjet ink compositions can exhibit mean shear viscosities after a period of 3 days at 60° C. that are within 5% or less of the respective initial mean shear viscosity. Embodiments of the aqueous inkjet ink compositions can exhibit mean shear viscosities after a period of 6 days at 60° C. that are within 5% or less of the respective initial mean shear viscosity.

The aqueous inkjet ink compositions may be used to form printed images. In embodiments, such a method comprises ejecting droplets of any of the disclosed aqueous inkjet ink compositions onto a substrate to form an image thereon. Such a method may further comprise incorporating the ink composition into an inkjet printing apparatus. The printing apparatus may employ a thermal inkjet process wherein the ink composition in the nozzles is selectively heated in an imagewise pattern, thereby causing droplets of the ink composition to be ejected in imagewise pattern. Alternatively, the printing apparatus may employ an acoustic inkjet process wherein droplets of the ink composition are caused to be ejected in imagewise pattern by acoustic beams. In yet another embodiment, the printing apparatus may employ a piezoelectric inkjet process, wherein droplets of the ink composition are caused to be ejected in imagewise pattern by oscillations of piezoelectric vibrating elements. Any suitable substrate can be employed.

The method may comprise ejecting ink droplets in an imagewise pattern onto an intermediate transfer member, heating the image to partially or completely remove solvents, and transferring the ink composition in the imagewise pattern from the intermediate transfer member to a final recording substrate. The intermediate transfer member may be heated to a temperature above that of the final recording sheet and below that of the ink composition in the printing apparatus. An offset or indirect printing process is also disclosed in, for example, U.S. Pat. No. 5,389,958, the disclosure of which is totally incorporated herein by reference.

Any suitable substrate or recording sheet can be employed as the final recording sheet. Illustrative substrates include McCoy® Gloss #100 coated substrate, Xerox® Bold uncoated substrate, Kodak photo paper, Sterling® Ultra Web Matte (offset coated), TrueJet® Gloss Text (Inkjet treated coated), and McCoy® Silk (offset coated).

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Latex Synthesis. A reactive surfactant solution of 1.4 grams (Hitenol® BC 1025 from Montello), 36 grams deionized water, and 0.7 gram of a silica nanoparticle solution (Ludox® TMA at 34%) was prepared by mixing in a glass reactor. The reaction was then purged with nitrogen for 30 minutes. The reactor was then continuously purged with nitrogen while being stirred at 250 rpm. The reactor was then heated up to about 75° C. and held there. Separately, 0.3 grams of ammonium persulfate (APS) initiator was dissolved in 5 grams of deionized water and added to the reactor.

Separately, a monomer emulsion was prepared in the following manner: 28 grams of styrene, 6 grams of butyl acrylate, 3 grams of methacrylic acid, 1 gram of sodium 4-styrenesulfonate (styrenesulfonic acid), 1 gram of hydroxyethyl acrylate (HEA), 0.6 g of 1-dodecanethiol (DDT), 0.2 gram of PEGDA 250, 0.8 gram of Hitenol® BC 1025, and 16 grams of deionized water were mixed to form an emulsion. The emulsified mixture was fed to the reactor slowly for about 2 hours and the reaction continued for about 1.5 hour. An additional 0.1 grams of APS initiator was dissolved in deionized water and added to the reactor over about 10 minutes and the reaction continued for an additional about 1.5 hours. The resulting latex was cooled to room temperature and neutralized to pH 8.0 with 0.5 M KOH solution.

The conversion of the monomers was measured and shown to be above 99.9% conversion. Thus, the weight of monomers in the monomer emulsion are same as in the resin particles, excluding the polymerizable surfactant from the calculation.

Example 2

White Aqueous inkjet ink composition. A white aqueous inkjet ink composition was formed using the latex of Example 1. The following steps were used to form the aqueous inkjet ink composition and the formulation is as shown in Table 1.
1. A BaSO$_4$ dispersion was added to deionized water and mixed for 15 minutes at a speed of 650 rpm using a cowles blade impeller.
2. The latex with resin particles (Example 1) was added slowly to the BaSO$_4$ dispersion and mixed for about 20 minutes (Mixture A).
3. In a separate beaker, the co-solvents, humectant, stabilizer, defoamer, surfactant, and wetting agent were mixed to form a homogenous mixture (Mixture B).
4. Mixture B was slowly added into Mixture A. Once the addition was complete, the components were allowed to mix for about 20 minutes.
5. The wax was added and mixing continued for about 15 minutes.
6. After mixing, the aqueous inkjet ink composition was left at room temperature for about 60 minutes before checking pH, conductivity and surface tension.

following claims. Unless specifically recited in a claim, steps or components of claims should not be implied or imported from the specification or any other claims as to any particular order, number, position, size, shape, angle, color, or material.

The invention claimed is:

1. An aqueous inkjet ink composition comprising:
water;
an optional co-solvent;
an optional dispersant;
resin particles comprising a polymerization product of reactants comprising a monomer, an acidic monomer, a hydrophilic monomer, a multifunctional monomer, and a reactive surfactant, and wherein the resin particles further comprise silica nanoparticles;
an optional wax; and
a pigment consisting essentially of a BaSO$_4$ pigment;
wherein a particle size distribution is defined as Span= (Dn90−Dn10)/(Dn50); and
wherein the BaSO$_4$ pigment has a wide particle size distribution and has a Span equal to 0.75 or greater.

2. The aqueous inkjet ink composition of claim 1, wherein the aqueous inkjet ink composition is free of other pigment.

3. The aqueous inkjet ink composition of claim 1, wherein the BaSO$_4$ pigment has the wide particle size distribution and has a Span equal to 1.0.

4. The aqueous inkjet ink composition of claim 1, wherein the BaSO$_4$ pigment has the wide particle size distribution and has a Span equal to 0.75, and wherein Dn50=400 nm, Dn10=250 nm, and Dn90=550 nm.

5. The aqueous inkjet ink composition of claim 1, wherein the BaSO$_4$ pigment has the wide particle size distribution

TABLE 1

| | | | Solids (weight %) (except for 1,2-hexandiol) | | | | | | |
|---|---|---|---|---|---|---|---|---|---|
| Component | Chemical | Weight % | A | B | C | D | E | F | G |
| Solvent | Water | 34 | | | | | | | |
| White Pigment | BaSO$_4$ | 10 | 4 | 6 | 8 | 8 | 8 | 11.5 | 15 |
| Latex | Latex (28.2% solids) | 15.8 | 4.47 | 4.47 | 4.47 | 4.47 | 4.47 | 4.47 | 4.47 |
| First Organic Solvent | Propylene glycol | 28.5 | | | | | | | |
| Second Organic Solvent | 1,2-hexanediol | 7 | 7 | 7 | 5 | 3.5 | 0 | 4.5 | 4.05 |
| Humectant | Glycerol | 2 | | | | | | | |
| Stabilizer | Triethanolamine | 0.2 | | | | | | | |
| Defoamer | BYK024 | 0.25 | | | | | | | |
| Surfactant | Silicone (Byk 349) | 0.5 | | | | | | | |
| Wetting Agent | Multifunctional nonionic surfactant Surfynol AD01 | 0.25 | | | | | | | |
| Wax | Michem Lube 190 (35% solids) | 1.5 | 0.525 | 0.525 | 0.525 | 0.525 | 0.525 | 0.525 | 0.525 |
| Total % | | 100 | 9 | 11 | 13 | 13 | 13 | 16.5 | 20 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the and has a Span equal to 1.0, and wherein Dn50=400 nm, Dn10=150 nm, and Dn90=550 nm.

6. The aqueous inkjet ink composition of claim 1, wherein the BaSO$_4$ pigment is present in the aqueous inkjet ink composition in an amount of from about 1 to about 25 percent by weight based upon a total weight of the aqueous inkjet ink composition.

7. The aqueous inkjet ink composition of claim 1, wherein the BaSO$_4$ pigment is present in the aqueous inkjet ink composition in an amount of from about 10 to about 15 percent by weight based upon a total weight of the aqueous inkjet ink composition.

8. The aqueous inkjet ink composition of claim 1, wherein the optional co-solvent is present; and wherein the optional co-solvent comprises one or more organic solvents.

9. The aqueous inkjet ink composition of claim 1, wherein the optional co-solvent is present; and wherein the optional co-solvent comprises: a first organic solvent, and a second organic solvent, wherein the first organic solvent is a diol.

10. The aqueous inkjet ink composition of claim 1, wherein the optional co-solvent is present; and wherein the optional co-solvent comprises: a first organic solvent, and a second organic solvent, wherein the first organic solvent is propylene glycol.

11. The aqueous inkjet ink composition of claim 1, wherein the optional co-solvent is present; and wherein the optional co-solvent comprises: a first organic solvent, and a second organic solvent, wherein the second organic solvent is an alkanediol having from 2 to 8 carbon atoms.

12. The aqueous inkjet ink composition of claim 1, wherein the optional co-solvent is present; and wherein the optional co-solvent comprises: a first organic solvent, and a second organic solvent, wherein the second organic solvent is a hexanediol.

13. The aqueous inkjet ink composition of claim 1, wherein the optional wax is present; and wherein the optional wax comprises a member selected from the group consisting of paraffin wax, polyethylene wax, polypropylene wax, microcrystalline wax, polyolefin wax, montan based ester wax, carnauba wax, and combinations thereof.

14. The aqueous inkjet ink composition of claim 1, wherein the aqueous inkjet ink composition is free of titanium dioxide.

15. A process of forming the aqueous ink composition of claim 1 comprising:
combining the water; the optional co-solvent; the optional dispersant; the resin particles; the optional wax; and the pigment consisting essentially of the BaSO$_4$ pigment, to form the aqueous ink composition.

16. The process of claim 15, wherein the aqueous ink composition is free of other pigment.

17. The process of claim 15, wherein the BaSO$_4$ pigment has the wide particle size distribution and has a Span equal to 0.75, and wherein Dn50=400 nm, Dn10=250 nm, and Dn90=550 nm; or
wherein the BaSO$_4$ pigment has the wide particle size distribution and has a Span equal to 1.0, and wherein Dn50=400 nm, Dn10=150 nm, and Dn90=550 nm.

18. The process of claim 15, wherein the BaSO$_4$ pigment is present in the aqueous ink composition in an amount of from about 1 to about 25 percent by weight based upon a total weight of the aqueous ink composition.

* * * * *